United States Patent
Kim et al.

(10) Patent No.: US 9,840,006 B2
(45) Date of Patent: Dec. 12, 2017

(54) SMART ROBOT APPARATUS AND DYNAMIC SERVICE PROVIDING METHOD USING SAME

(75) Inventors: Hyun-Ho Kim, Seoul (KR); Jong Cheol Kim, Seoul (KR)

(73) Assignee: KT Corporation, Seongnam (KR)

( * ) Notice: Subject to any disclaimer, the term of this patent is extended or adjusted under 35 U.S.C. 154(b) by 315 days.

(21) Appl. No.: 13/994,948

(22) PCT Filed: May 27, 2011

(86) PCT No.: PCT/KR2011/003899
§ 371 (c)(1),
(2), (4) Date: Jun. 17, 2013

(87) PCT Pub. No.: WO2012/081777
PCT Pub. Date: Jun. 21, 2012

(65) Prior Publication Data
US 2013/0268116 A1 Oct. 10, 2013

(30) Foreign Application Priority Data
Dec. 17, 2010 (KR) .................. 10-2010-0130003

(51) Int. Cl.
*B25J 9/16* (2006.01)
*G08C 17/00* (2006.01)

(52) U.S. Cl.
CPC ............. *B25J 9/16* (2013.01); *G08C 17/00* (2013.01)

(58) Field of Classification Search
CPC .................................. B25J 9/16; G08C 17/00
(Continued)

(56) References Cited

U.S. PATENT DOCUMENTS 6,175,860 B1 * 1/2001 Gaucher ................. 709/208
6,225,938 B1 * 5/2001 Hayes .............. G11B 15/023
235/462.45
(Continued)

FOREIGN PATENT DOCUMENTS

KR 10-2006-0082121 A 7/2006
KR 10-2007-0093661 A 9/2007
(Continued)

OTHER PUBLICATIONS

Office Action for KR 10-2010-0130003 dated Jan. 7, 2013.
International Search Report for PCT/KR2011/003899 dated Feb. 6, 2012.

*Primary Examiner* — Edwin Holloway, III
(74) *Attorney, Agent, or Firm* — Sughrue Mion, PLLC

(57) ABSTRACT

A smart robot apparatus and a dynamic service providing method using same for controlling an external device by using a certain code recognizer provided on the robot without needing an additional operation from a user and for providing various services desired by the user and described in various codes. The smart robot apparatus and the dynamic service providing method using same may conveniently control an external device without inconveniencing the user by needing to operate an additional input interface. Further, since the smart robot apparatus includes various wire or wireless network interfaces, not only indoor devices under a ubiquitous environment but also external devices such as smart phones and cell phones for mobile communication can be controlled.

28 Claims, 3 Drawing Sheets

(58) Field of Classification Search
USPC .................. 340/10.5, 12.51, 12.53; 341/176
See application file for complete search history.

(56) References Cited

U.S. PATENT DOCUMENTS

| | | | |
|---|---|---|---|
| 6,498,567 B1* | 12/2002 | Grefenstette et al. | 340/12.24 |
| 6,677,852 B1* | 1/2004 | Landt | 340/10.1 |
| 2002/0125996 A1* | 9/2002 | Feinberg | 340/10.41 |
| 2007/0090966 A1* | 4/2007 | Watanabe et al. | 340/825.69 |
| 2008/0204301 A1* | 8/2008 | Sandberg | 341/176 |
| 2010/0081375 A1* | 4/2010 | Rosenblatt | G08C 17/02 |
| | | | 455/41.1 |
| 2011/0251892 A1* | 10/2011 | Laracey | G06Q 30/0253 |
| | | | 705/14.51 |
| 2012/0050018 A1* | 3/2012 | Sajadi et al. | 340/10.1 |
| 2012/0128267 A1* | 5/2012 | Dugan | H04L 67/36 |
| | | | 382/321 |

FOREIGN PATENT DOCUMENTS

| | | |
|---|---|---|
| KR | 10-2008-0010695 A | 1/2008 |
| KR | 10-2008-0045340 A | 5/2008 |
| WO | 02/082363 A1 | 10/2002 |

* cited by examiner

SMART ROBOT APPARATUS AND DYNAMIC SERVICE PROVIDING METHOD USING SAME

CROSS-REFERENCE TO RELATED APPLICATION

The present application is a national phase entry under 35 U.S.C. §371 of International Application No. PCT/KR2011/003899 filed May 27, 2011, which claims priority to Korean Patent Application No. 10-2010-0130003 filed in the Republic of Korea on Dec. 17, 2010, the disclosures of which are incorporated herein by reference in their entirety.

BACKGROUND

1. Field

Exemplary embodiments broadly relate to a smart robot apparatus and a dynamic service providing method using the robot, and more particularly, to a smart robot apparatus for controlling an external device by using a certain code recognizer provided on the robot without needing additional operation by a user and for providing various services desired by the user and included in various codes, and to a dynamic service providing method using the robot.

2. Description of the Related Art

Robot apparatuses are increasingly used in many aspects of modern life. In the past, robot apparatuses merely performed intended simple actions as instructed by a user operation. For example, the robot apparatus may include a robot for cleaning. A method of storing certain information desired by a user in certain codes is widely used. For example, the certain codes may include bar codes, radio-frequency identification (RFID), quick response (QR) codes, etc. A barcode is a code made by combing black and white bars having different thicknesses so as to be read out by a computer. The barcode is mainly printed on a product wrapping paper. Such a traditional type barcode is referred to as a linear (one-dimensional) barcode.

The RFID technology is to recognize information at a relatively long distance by using radio waves. The RFID technology requires an RFID tag and an RFID reader. The RFID tag includes an antenna and an integrated circuit. Information is recorded on the integrated circuit and the antenna transmits the information to the RFID reader. The information is used to identify an object on which the RFID tag is attached. In other words, the RFID tag functions like a barcode. The RFID technology is different from the barcode system in that radio waves instead of light are used for reading data on the tag. Accordingly, the RFID technology may operate at a relatively long distance compared to the barcode technology. For example, an RFID tag relatively far from the reader may still be read and even information placed on a tag behind an object may be received using the RFID reader.

The RFID technology may be classified by a frequency of a radio wave used for the communication rather than the power. An RFID using a low frequency is referred to as low-frequency identification (LFID) and uses a radio wave having a frequency of about 120-140 kHz. High-frequency identification (HFID) uses a radio wave having a frequency of about 13.56 MHz. Ultra high-frequency identification (UHFID) uses a radio wave having a frequency of about 868-956 MHz.

A typical barcode is a linear (one-dimensional) barcode. However, such a method has difficulty containing a large amount of information and thus a matrix (two-dimensional) code formed of dots in a hexagonal or rectangular array has been developed. Strictly speaking, the matrix code is not a barcode, but it is often referred to as a two-dimensional (2D) barcode.

A QR code that is most frequently used among the two-dimensional barcodes is a two-dimensional barcode in a matrix form indicating information in a black and white lattice pattern. The QR code is widely used in Japan and the name is derived from "Quick Response"™ that is a registered trademark of Denso Wave. The QR code is a two-dimensional barcode, which overcomes the limited capacity of the barcode that has been often used and extends the format and contents that can be provided therein. The QR code containing information in two dimensions may store text data in addition to numbers. The QR code is often used in the form of being read by a digital camera or an exclusive scanner.

Methods of simply controlling robots by using information included in the above codes have been suggested. However, under a current ubiquitous environment, a user demands a robot capable of controlling an external device installed in a house, without user involvement, by using information included in the above code.

SUMMARY

Exemplary embodiments provide a smart robot apparatus for controlling an external device by using a certain code recognizer provided on the robot without needing an additional operation by a user and provides various services desired by the user and included in various codes, and further provides a dynamic service providing method using the robot.

Illustrative, non-limiting embodiments may overcome the above disadvantages and other disadvantages not described above. The present invention is not necessarily required to overcome any of the disadvantages described above, and the illustrative, non-limiting embodiments may not overcome any of the problems described above. The appended claims should be consulted to ascertain the true scope of the invention.

According to an aspect of exemplary embodiments, there is provided a smart robot apparatus including a processor which is configured to extract control information of at least one external device from coded information, and a network interface configured to modulate the control information extracted by the processor based on a communication type of the external device and configured to output the modulated control information to the external device.

The smart robot apparatus may further include a control result process receiver configured to receive a control result, from the external device, provided based on the output control information, and a control result outputter configured to output the received control result.

The coded information may be included in one of a one-dimensional barcode, a two-dimensional barcode, and an RFID tag.

The processor may be a barcode reader or an RFID reader.

The communication type of the external device may be one of a wired communication type and a wireless communication type.

The code information may include at least one of a network address of the external device, a home network address of the external device, and a number of the external device and wherein the external device is one of a home network appliance, a remote device, and a portable terminal.

The interface may include a connector configured to set a connection to the external device based on at least one of a network address of the external device, a home network address of the external device, and a number of the external device, wherein the external device is at least one of a home network appliances, a remote device, and a portable terminal, a modulator configured to modulate the extracted control information based on the a communication type of the external device, and an outputter configured to output the modulated control information to the external device.

According to yet another aspect of an exemplary embodiment, there is provided a dynamic service providing method using a smart robot apparatus, which includes extracting control information of at least one external device included in coded information, modulating the extracted control information according to a communication type of the external device and outputting the modulated control information.

The method may further include receiving a control result from the external device based on the output control information, and displaying the received control result.

The coded information may be included in one of a one-dimensional barcode, a two-dimensional barcode, and an RFID tag.

The extracting may be performed by a barcode reader or an RFID reader.

The code information may include at least one of a network address of the external device, a home network address of the external device, and a number of the external device, the external device comprising one of a remote device, a home network appliance, and a portable terminal.

The modulating and the outputting may include setting a connection to the external device based on at least one of a network address of the external device, a home network address of the external device, and a number of the external device, wherein the external device is one of a remote device, a home network appliance, and a portable terminal, modulating the extracted control information based on a communication type of the external device, and outputting the modulated control information to the external device.

The communication type of the external device may be one of a wired communication type and a wireless communication type.

According to exemplary embodiments, the smart robot apparatus and dynamic service providing method using same may conveniently control an external device without requiring additional operations from an additional input interface. Further, since the smart robot apparatus according to exemplary embodiment may comprise various wire or wireless network interfaces, not only indoor devices under a ubiquitous environment but also external devices such as smart phones and cell phones for mobile communication can be controlled.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Figure 1:
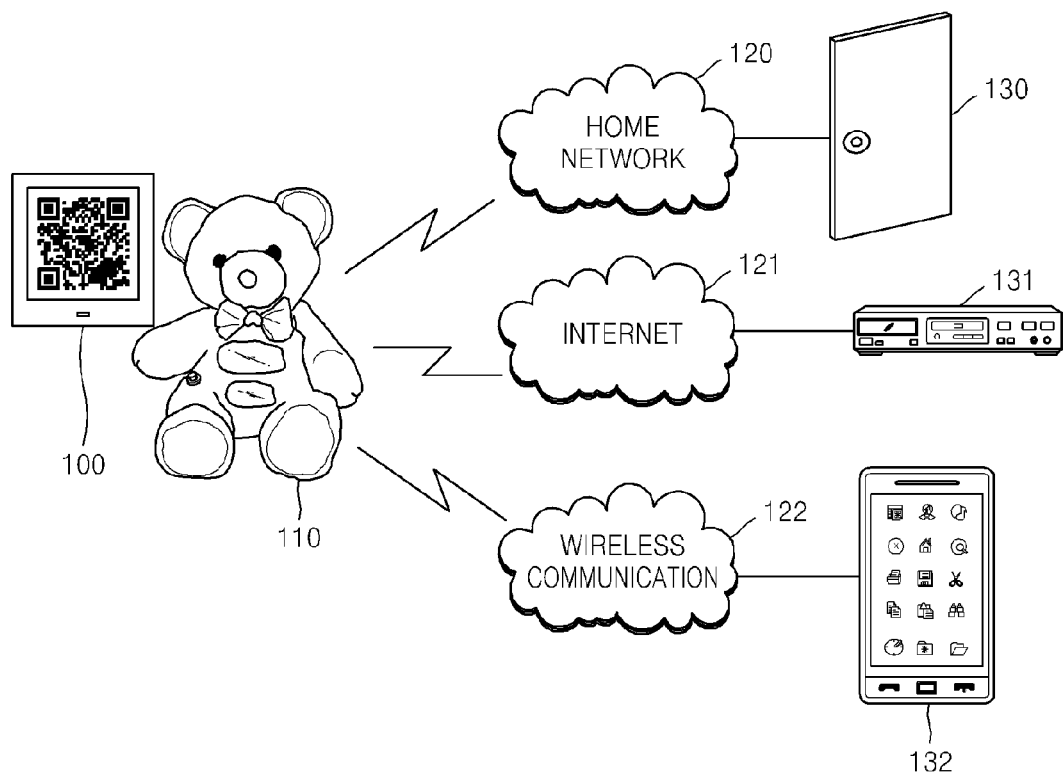
FIG. 1 is a view illustrating various services provided by using a smart robot apparatus according to an exemplary embodiment.

Hereinafter, exemplary embodiments will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just examples for the purpose of illustrations only, not intended to limit the scope of the disclosure, so it should be understood that other equivalents and modifications could be made thereto without departing from the spirit and scope of the disclosure.

A smart robot apparatus, according to an exemplary embodiment, includes a data processor for extracting control information of at least one external device included in coded information, and a network interface configured to modulate and output the extracted control information according to a communication type of the external device.

A dynamic service providing method, according to an exemplary embodiment, using a smart robot apparatus includes extracting control information of at least one external device included in coded information, and modulating and outputting the extracted control information according to a communication type of the external device.

The attached drawings for illustrating exemplary embodiments are referred to in order to gain a sufficient understanding of exemplary embodiments, the merits thereof, and the aspects accomplished by the implementation of the exemplary embodiments. Hereinafter, exemplary embodiments will be described in detail with reference to the attached drawings. Like reference numerals in the drawings denote analogous elements according to an exemplary embodiment.

An aspect of exemplary embodiments is to provide a smart robot apparatus for controlling an external device by using a certain code recognizer provided on the robot without needing any additional operations by a user and to provide various services desired by the user and included in various codes, and to provide a dynamic service providing method using the robot.

The smart robot apparatus and the dynamic service providing method using same according to one or more exemplary embodiments may conveniently control an external device without having the inconvenience of operating of an additional input interface.

The smart robot apparatus according to one or more exemplary embodiment, may comprise various wire or wireless network interfaces, and control not only indoor devices under a ubiquitous environment but also external devices such as smart phones and cell phones for mobile communication.

FIG. 1 is a view illustrating various services provided by using a smart robot apparatus according to an exemplary embodiment.

As illustrated in FIG. 1, a smart robot apparatus 110 controls an external device as a user desires by reading out a one-dimensional or a two-dimensional code 100 to extract control information of an external device included in the code 100.

The smart robot apparatus 110 of an exemplary embodiment performs control of lights, gas, and/or a door lock 130, which are indoor devices and included in a QR code as an example of the two-dimensional code 100. The above control is performed via a connection to a home networking system 120 and is provided by way of an example only and not by way of a limitation.

The smart robot apparatus 110 reproduces and outputs a movie or video by controlling an IPTV 131 using information about the movie or the video included the QR code 100, according to an exemplary embodiment. The smart robot apparatus 110 controls the IPTV 131 via a connection to the Internet 121. This is provided by way of an example only and not by way of a limitation.

When a medium on which the QR code 100 is printed approaches the smart robot apparatus, the smart robot apparatus 110 activates a code reader or a camera to be set in a code recognition enable state, according to an exemplary embodiment. Then, the smart robot apparatus 110 in the code recognition enable state reads out a code using the code reader or the camera to extract control information of an external device.

In an exemplary embodiment, when a user desires to control the volume of an "IPTV settop box", the user generates the QR code 100 (a two-dimensional barcode) with a code corresponding to "IPTV volume control". Accordingly, when generated QR code 100 approaches a code recognizer such as the code reader of the smart robot apparatus 110, the smart robot apparatus 110 reads out the QR code 100 to extract code information of "IPTV volume control".

Also, when the user makes a picture card including the RFID tag 100 having an RFID code corresponding to a movie "Toy Story" approach the RFID reader of the smart robot apparatus 110, the smart robot apparatus 110 reads out the RFID tag 100 to extract control information corresponding to reproduce the movie "Toy Story" and transfers the control information to the IPTV settop box so that the movie "Toy Story" may be reproduced on a TV connected to the IPTV settop box.

The smart robot apparatus 110 performs video calling or text messaging with a smart phone or a cell phone 132 using a connection to a wireless communication network 122 based on portable terminal number information of the smart phone or the cell phone 132 included in the QR code 100, according to an exemplary embodiment. This is provided by way of an example only and not by way of a limitation.

Figure 2:
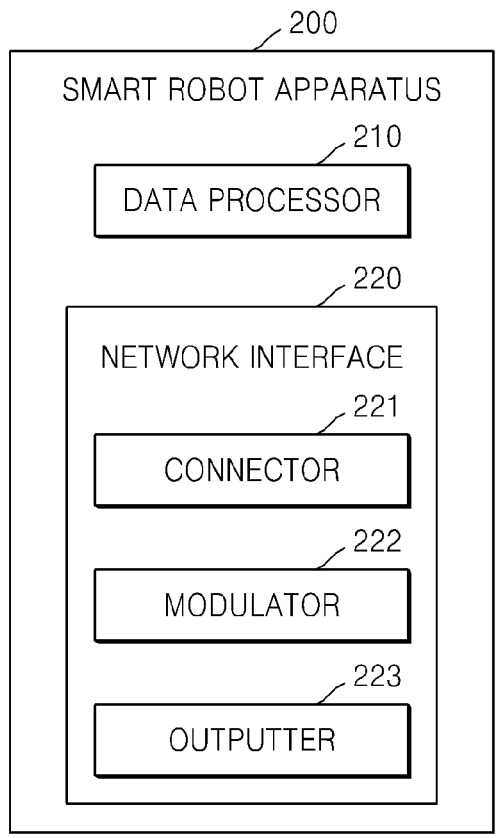
FIG. 2 is a block diagram illustrating a structure of a smart robot apparatus according to an exemplary embodiment.

FIG. 2 is a block diagram illustrating a structure of a smart robot apparatus according to an exemplary embodiment.

A smart robot apparatus 200 includes a data processor 210 and a network interface 220. The data processor 210 extracts control information of at least one external device included in coded information. In an exemplary embodiment, the coded information may be defined as information which is coded in at least one of a one-dimensional barcode, a two-dimensional barcode, and an RFID tag. This is provided by way of an example only and not by way of a limitation. Thus, the data processor 210 according to an exemplary embodiment is an exemplary code recognizer. In an exemplary embodiment, a barcode reader or an RFID reader may be the data processor 210. This is provided by way of an example and not by way of a limitation.

When a QR code is scanned by a smart phone such as iPhone, various pieces of information may be received. The QR code is widely used as distribution of smart phones increases. A smart phone user may easily obtain various pieces of information by downloading a QR code scan application that is supplied for free and scan a QR code posted on ad bulletins, promotion sheets, posters, magazines, or the Internet by using a smart phone.

The RFID reader is an apparatus to communicate with a tag to use information provided on the tag or transmit information collected from the tag to a back-end system. The RFID reader has a fixed type and a portable type. A fixed type RFID reader reads out a moving tag and is connected to the back-end system via a wired network. A portable type RFID reader reads out a fixed tag and is connected to the back-end system via a wireless network. An exemplary embodiment of the RFID reader may be a smart card reader.

The smart robot apparatus according to an exemplary embodiment may control an external device by extracting control information of the external device included in a code via a smart card reader.

The network interface unit 220 modulates and outputs the extracted control information according to a communication type of the external device. The network interface 220 includes, in detail, a connector 221, a modulator 222, and an outputter 223.

The connector 221 sets a connection to the external device based on at least one of a network address of the external device, a home network address, and the number of a portable terminal. Information regarding the network address of the external device, the home network address, and the number of a portable terminal are included in at least one of a one-dimensional barcode, a two-dimensional barcode, and an RFID tag.

The connector 221 may include a wired LAN module, a wireless LAN module, a mobile communication module, a Bluetooth module, an IR communication module, a power line communication module, etc. for wired or wireless communication connection with external devices. In an exemplary embodiment, a module may include a combination of hardware and software. The modulator 222 modulates the extracted control information according to a communication type of the external device according to an exemplary embodiment. The outputter 223 outputs the modulated control information to the external device.

In an exemplary embodiment, the external device receiving the control information from the smart robot apparatus 200 performs an operation corresponding to the control information. In an exemplary embodiment, when the control information included in the code is "IPTV volume up", the IP settop box that is the external device, referring to a list of control information stored in a mapping table or a database, performs a function of increasing the volume of an IPTV corresponding to the control information "IPTV volume up".

The smart robot apparatus 200 of an exemplary embodiment may further include a control result process receiver (not shown) and a control result outputter (not shown). The control result process receiver receives a control result of the external device from the external device based on the extracted control information. The control result outputter displays a control result of the external device. The control result outputter may include a display configured to output a control process result on a screen and a speaker configured to output an effect sound.

The smart robot apparatus according to an exemplary embodiment may include a motion controller such as a motor or a wheel to control the motion of a robot.

Figure 3:
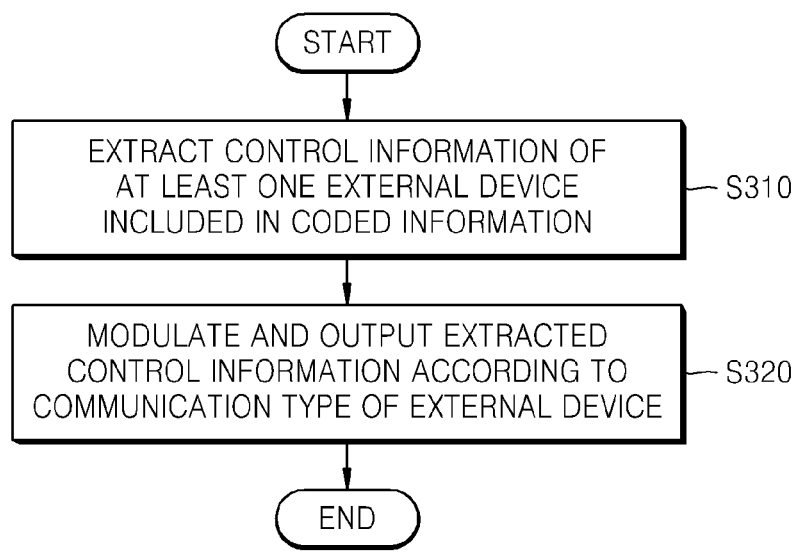
FIG. 3 is a flowchart illustrating a dynamic service providing method using a smart robot apparatus according to an exemplary embodiment.

FIG. 3 is a flowchart illustrating a dynamic service providing method using a smart robot apparatus according to an exemplary embodiment.

The dynamic service providing method using a smart robot apparatus according to an exemplary embodiment includes a data processing operation (S310) and an interface processing operation (S320). In the data processing operation (S310), control information of at least one external device included in coded information is extracted. In the interface processing operation (S320), the extracted control information is modulated and output according to a communication type of the external device.

Figure 4:
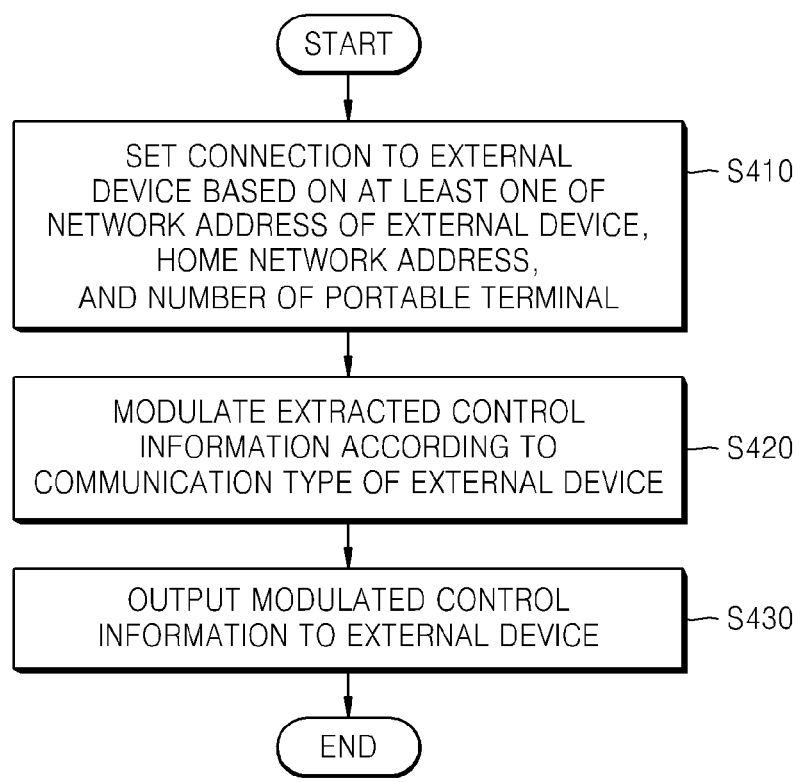
FIG. 4 is a flowchart illustrating a dynamic service providing method using a smart robot apparatus according to an exemplary embodiment.

FIG. 4 is a flowchart illustrating a dynamic service providing method using a smart robot apparatus according to an exemplary embodiment.

In a dynamic service providing method, an interface processing operation such as the interface processing operation (S320) may include a connecting operation (S410), a modulation operation (S420), and an output operation (S430).

In the connecting operation (S410), connection to an external device is set based on at least one of a network address of the external device, a home network address, and the number of a portable terminal. In the modulating operation (S420), the extracted control information is modulated according to the communication type of the external device. In the output operation (S430), the modulated control information is output to the external device.

Exemplary embodiments have been particularly shown and described in detail. However, it will be understood by those skilled in the art that various changes in form and details may be made therein without departing from the spirit and scope of the disclosure as defined by the appended claims and their equivalents.

It will be understood by those skilled in the art that various changes and modifications may be made without changing a technical conception and/or any essential features of the exemplary embodiments. Thus, above-described exemplary embodiments are exemplary in all aspects, and do not limit the present disclosure. The scope of the present disclosure is defined by the following claims and their equivalents rather than by the detailed description of exemplary embodiments. It shall be understood that all modifications and embodiments conceived from the meaning and scope of the claims and their equivalents are included in the scope of the present disclosure.

The invention claimed is:

1. A smart robot apparatus comprising:
   a processor configured to extract control information of at least one external device from a quick response (QR) code stored on a tangible medium; and
   a network interface configured to modulate the control information extracted by the processor based on a type of a communication module of the external device and output the modulated control information to the external device,
   wherein the QR code is generated on the tangible medium in response to a user request to control the external device, and
   wherein, in response to the control information instructing the smart robot apparatus to perform video calling or text messaging with a mobile terminal, as the external device, through a wireless communication network according to portable terminal number information of the mobile terminal included in the QR code, the processor implements the video calling or text messaging.

2. The smart robot apparatus of claim 1, further comprising:
   a control result process receiver configured to receive, from the external device, a control result provided based on the output control information; and
   a control result outputter configured to output the received control result.

3. The smart robot apparatus of claim 1, wherein the control information is included in one of a one-dimensional barcode, a two-dimensional barcode, and an RFID tag.

4. The smart robot apparatus of claim 1, wherein the processor is a barcode reader or an RFID reader.

5. The smart robot apparatus of claim 1, wherein the type of the communication module of the external device is one of a wired communication module and a wireless communication module.

6. The smart robot apparatus of claim 1, wherein the external device is one of a home network appliance, a remote device, and the mobile terminal.

7. The smart robot apparatus of claim 1, wherein the network interface comprises:
   a connector configured to set a connection to the external device based on at least the home network address of the external device, wherein the external device is at least one of a home network appliance, a remote device, and the mobile terminal;
   a modulator configured to modulate the extracted control information based on the type of the communication module of the external device; and
   an outputter configured to output the modulated control information to the external device.

8. A dynamic service providing method using a smart robot apparatus, the method comprising:
   extracting control information of at least one external device from a quick response (QR) code stored on a tangible medium;
   modulating the extracted control information according to a type of a communication module of the external device; and
   outputting the modulated control information to the external device; and
   executing, in response to the control information instructing the smart robot apparatus to perform video calling or text messaging with a mobile terminal, as the external device, through a wireless communication network according to portable terminal number information of the mobile terminal included in the QR code, the video calling or text messaging,
   wherein the QR code is generated, on the tangible medium, in response to a user request to control the external device.

9. The method of claim 8, further comprising:
   receiving a control result from the external device based on the output extracted control information; and
   displaying the received control result.

10. The method of claim 8, wherein the control information is included in one of a one-dimensional barcode, a two-dimensional barcode, and an RFID tag.

11. The method of claim 8, wherein the extracting is performed by a barcode reader or an RFID reader.

12. The method of claim 8, wherein the external device comprises at least one of a remote device, a home network appliance, and the mobile terminal.

13. The method of claim 8, wherein the modulating and outputting further comprises:
setting a connection to the external device based on at least the home network address of the external device, wherein the external device is at least one of a remote device, a home network appliance, and the mobile terminal;
modulating the extracted control information based on the type of the communication module of the external device; and
outputting the modulated control information to the external device.

14. The method of claim 8, wherein the type of the communication module of the external device is one of a wired communication module and a wireless communication module.

15. The smart robot apparatus according to claim 1, further comprising a code recognizer which reads the control information from an approaching medium and a memory which stores instructions for executing the extracting and modulating.

16. The smart robot apparatus according to claim 15, wherein the code recognizer is at least one of a barcode reader or an RFID reader and comprises at least one of a sensor and a camera.

17. The smart robot apparatus according to claim 1, wherein the network interface comprises a determiner configured to determine the type of communication module of a communication method for the external apparatus from a plurality of types of communication modules of the communication methods comprising an Internet communication network, a cellular network, and a home network, and a modulator configured to differently modulate the control information based on the different determined types of the communication modules of the communication methods.

18. The smart robot apparatus of claim 1, wherein the processor switches the smart robot apparatus to a code recognition enable state when a computer readable recording medium having the control information recorded thereon, approaches the smart robot apparatus.

19. The smart robot apparatus of claim 1, wherein the external device is an indoor appliance connected to a home network and wherein the control information comprises an instruction to the indoor appliance to execute at least one function without further input.

20. The smart robot apparatus of claim 1, wherein the QR code comprises a home network address of the at least one external device.

21. The smart robot apparatus of claim 1, wherein the control information comprises a network address of the external device, and
wherein the tangible medium is remote from the external apparatus.

22. The method of claim 8, further comprising:
causing the tangible medium, on which the QR code is stored, to approach a code recognizer of the smart robot apparatus,
wherein the modulated control information is output to the external device remote from the tangible medium and the smart robot apparatus and comprises a command to control the external device.

23. The smart robot apparatus of claim 1, wherein the QR code is printed on the tangible medium.

24. The smart robot apparatus of claim 1, wherein the QR code is displayed by a device which received the QR code via a network connection.

25. The smart robot apparatus of claim 1, further comprising:
a motion controller comprising any of a motor and a wheel configured to control motion of the smart robot apparatus.

26. The smart robot apparatus of claim 1, wherein the network interface is further configured to output the modulated control information to the external device according to the home network address extracted from the QR code.

27. The smart robot apparatus of claim 1, wherein the smart robot apparatus and the at least one external device are connected to the home network.

28. The smart robot apparatus according to claim 1, wherein in response to the control information instructing the smart robot apparatus to perform video calling with the mobile terminal, the processor performs the video calling to the mobile terminal according to the portable terminal number information included in the QR code.

* * * * *